US007719437B2

(12) United States Patent
Bertram, III

(10) Patent No.: US 7,719,437 B2
(45) Date of Patent: May 18, 2010

(54) MAGNETIC BED-RAIL ATTACHMENT PARTICULARLY SUITED TO STERILE ENVIRONMENTS

(76) Inventor: Morton Bertram, III, 101 8th St. South, Naples, FL (US) 34102

( * ) Notice: Subject to any disclaimer, the term of this patent is extended or adjusted under 35 U.S.C. 154(b) by 944 days.

(21) Appl. No.: 11/062,357

(22) Filed: Feb. 22, 2005

(65) Prior Publication Data

US 2005/0184207 A1 Aug. 25, 2005

Related U.S. Application Data

(60) Provisional application No. 60/545,956, filed on Feb. 19, 2004.

(51) Int. Cl.
*B60P 3/00* (2006.01)

(52) U.S. Cl. .............. 340/815.73; 362/396; 248/229.15

(58) Field of Classification Search ............ 340/815.73, 340/815.74, 815.77; 362/396, 431, 436, 362/438, 383; 356/68; 248/229.1, 229.15, 248/229.25; 5/658, 512, 662, 663, 906
See application file for complete search history.

(56) References Cited

U.S. PATENT DOCUMENTS

| | | | | | |
|---|---|---|---|---|---|
| 1,915,985 | A * | 6/1933 | Edwards | ................ | 340/286.07 |
| 2,607,881 | A * | 8/1952 | Anderson | .................. | 362/144 |
| 3,757,363 | A * | 9/1973 | Langlais | ..................... | 5/503.1 |
| 4,432,042 | A * | 2/1984 | Zeller | ......................... | 362/183 |
| 5,180,220 | A * | 1/1993 | Van Kalsbeek | .............. | 362/98 |
| 5,472,163 | A * | 12/1995 | Callas | ...................... | 248/206.5 |
| 6,039,293 | A * | 3/2000 | Minet | ...................... | 248/125.8 |
| 6,042,067 | A * | 3/2000 | Mendelsohn et al. | ..... | 248/213.2 |
| 6,962,314 | B2 * | 11/2005 | Hsu | ........................ | 248/205.5 |
| 2006/0083010 | A1 * | 4/2006 | Ping | ........................... | 362/396 |

* cited by examiner

*Primary Examiner*—Toan N Pham
(74) *Attorney, Agent, or Firm*—Gifford, Krass, Sprinkle, Anderson & Citkowski, P.C.

(57) ABSTRACT

A multi-component attachment system, including a first clamp that attaches to a bed-rail, and a second component which connects to a lighting system or other accessory, allows a sterile drape to go over the bed-rail attachment, while allowing a lamp or other accessory to magnetically attach through the drape, thereby preventing interruption of the sterile field.

5 Claims, 2 Drawing Sheets

MAGNETIC BED-RAIL ATTACHMENT PARTICULARLY SUITED TO STERILE ENVIRONMENTS

REFERENCE TO RELATED APPLICATION

This application claims priority from U.S. Provisional Patent Application Ser. No. 60/545,956, filed Feb. 19, 2004, the entire content of which is incorporated herein by reference.

FIELD OF THE INVENTION

This invention relates generally to hospital and surgical appliances and, in particular, to a magnetic attachment for lights, and so forth, particularly in sterile environments.

BACKGROUND OF THE INVENTION

It is often difficult for surgeons and other medical practitioners to adequately visualize procedures without appropriate lighting. It has been found that flexible or "gooseneck" lights are advantageous for this purpose, as they may be flexed or snaked to guide illumination directly to an area of interest. The problem, however, is that once a sterile field is created, these lamps must be clamped to the bed-rail, or the like, thereby interrupting the sterile fields and creating a potential source of germs and pathogens.

SUMMARY OF THE INVENTION

This invention improves this situation through the use of a magnetically coupled multi-component attachment system. The preferred embodiment includes a first clamp that attaches to a bed-rail, and a second component which connects to a lighting system or other apparatus, with a magnetic attachment therebetween. This allows a sterile drape to go over the bed-rail attachment, while allowing a lamp within the sterile field to magnetically attach through the drape, thereby preventing interruption of the field.

DETAILED DESCRIPTION OF THE INVENTION

Figure 1:
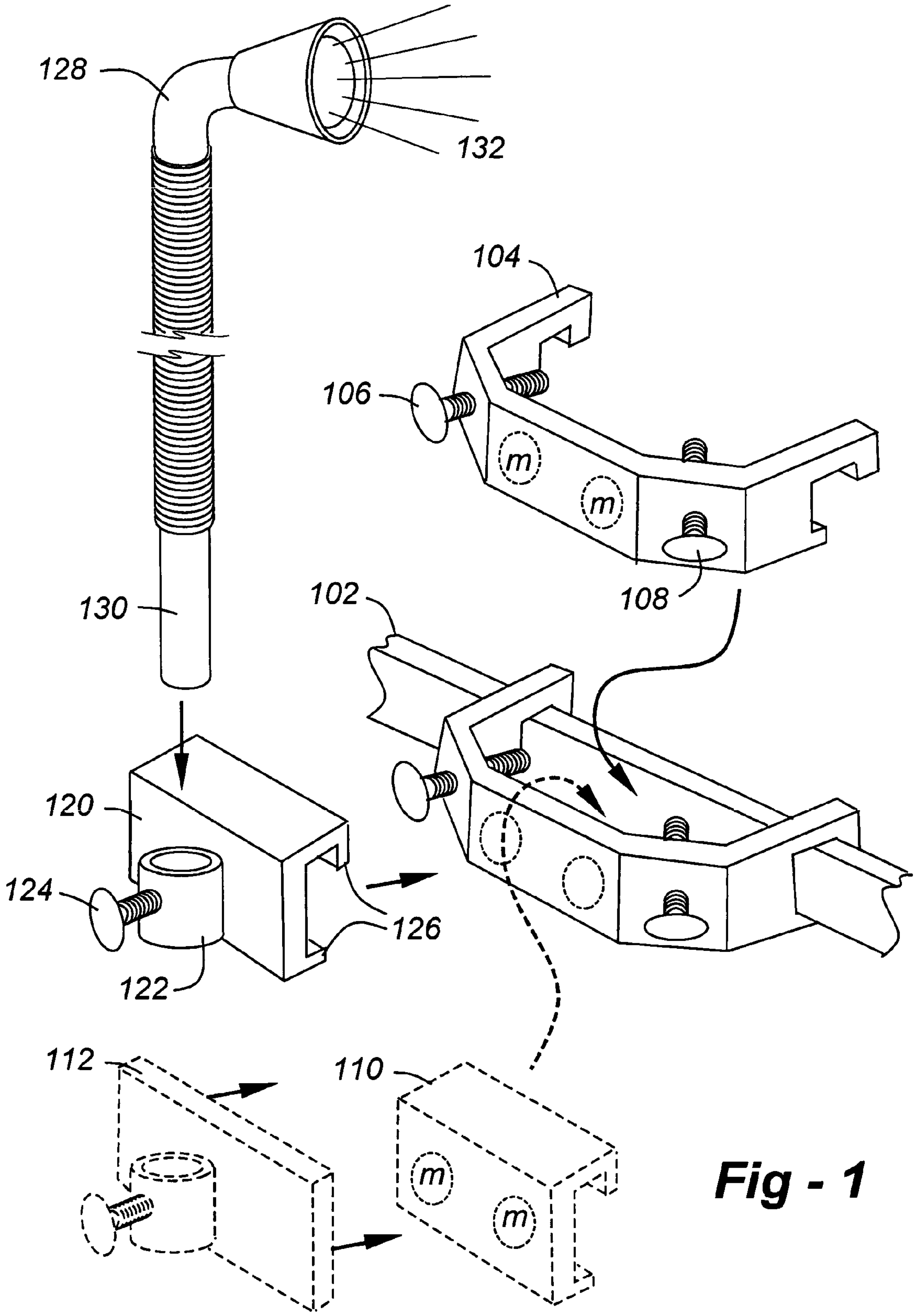
FIG. 1 is a drawing depicting the components associated with preferred embodiments of the invention.

FIG. 1 is a drawing depicting the components associated with preferred embodiments of the invention. A clamp 104 attaches to a bed-rail 102. Such a clamp may utilize a "Clark" attachment, which fits into recesses or notches (not shown) on the bed-rail, and which uses manual fasteners such thumb screws 106 and 108 for tightening purposes.

Figure 2:
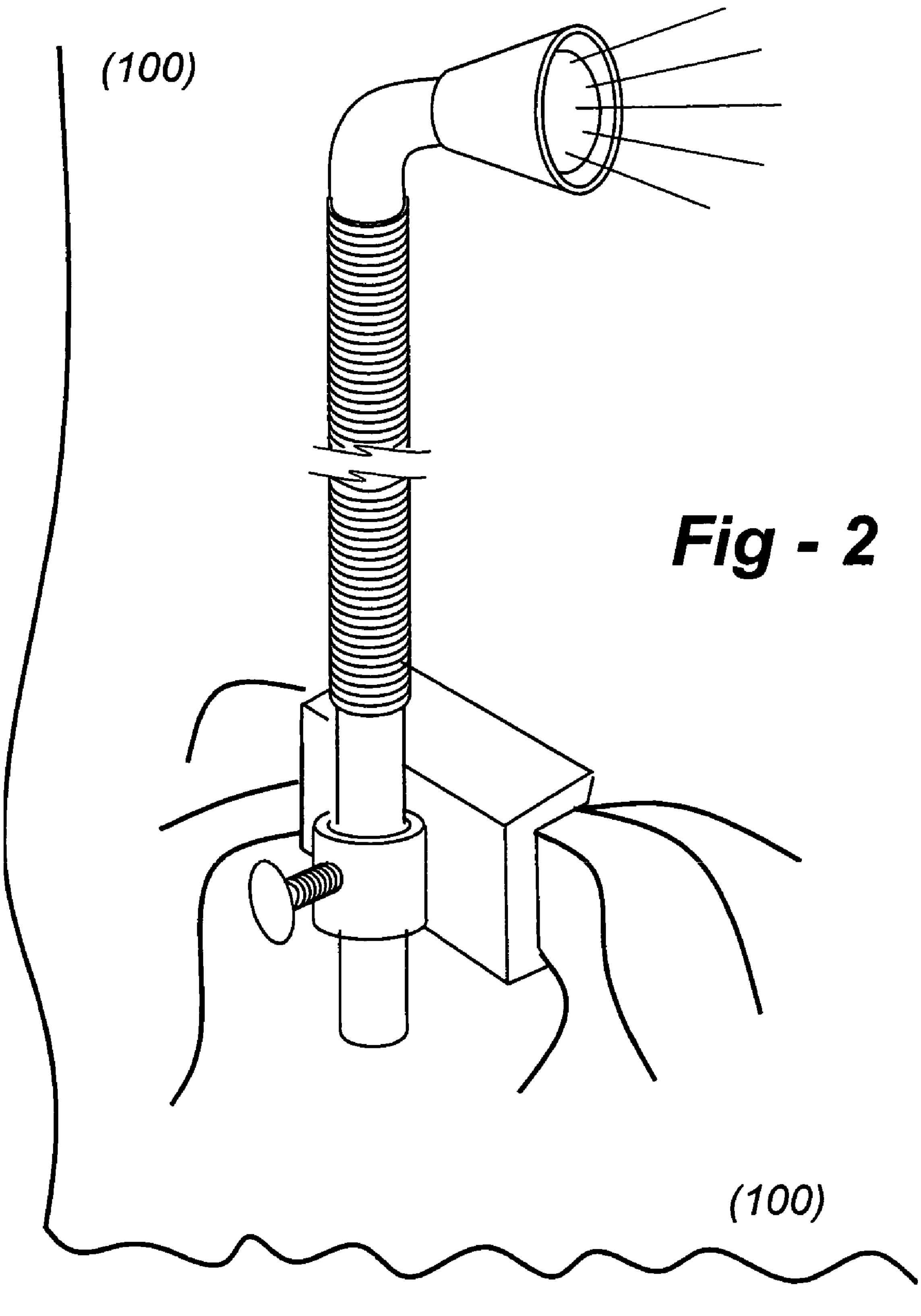
FIG. 2 illustrates a lamp installed to a bed rail using the components of FIG. 1.

Unlike existing clamps, however, the inventive clamp 104 includes one or more magnets (m) adapted for coupling to a second component 120. Preferably, rare earth or other very strong magnets are used. As shown in FIG. 2, this allows a drape 100 to be dressed over the clamp 104, with component 120 being held in position by way of magnetic attraction. The component 120 includes a sleeve 122 and manual fastener 124, to receive the stem 130 of a flexible lamp 128 providing illumination where needed as shown as 132.

Apart from the preferred embodiment just described, there are several variations to the invention. First, the magnets may be located either on component 104 or 120. Location on component 120 may allow a conventional "Clark" attachment to be used. The magnets may also be located on an intermediate piece 110, which should also permit a standard Clark bracket to be used. Although lip features 126 are preferably used, these may not be necessary with strong magnets, allowing a simpler plate such as 112 to be used. Finally, although the coupling shown is adapted to receive a gooseneck lamp, other accessories may be accommodated, including non-gooseneck lights, trays, tubing holders, and any other appliance benefiting from isolation from the bed or frame.

I claim:

1. An accessory holder for use with a bed having a frame and a sheet or drape, comprising:

a first component that attaches to the bed frame;

a second component including a coupling to receive an accessory; and one or more magnets allowing second component to be magnetically coupled to first component through the sheet or drape.

2. The accessory holder of claim 1, wherein the accessory is a lamp.

3. The accessory holder of claim 1, wherein the first component attaches to the bed frame using a Clark-type coupling.

4. The accessory holder of claim 1, wherein the second component further includes overhang or underhang feature to provide mechanical coupling in addition to magnetic coupling.

5. The accessory holder of claim 1, further including an intermediate component that mechanically attaches to the first component and provides a magnetic coupling to the second component.

* * * * *